United States Patent [19]
Gartz

[11] Patent Number: 5,915,550
[45] Date of Patent: Jun. 29, 1999

[54] CASE AND TRAY FOR HOLDING TWO MEDIA STORAGE UNITS

[76] Inventor: Kaj Gartz, 275 Hemlock Dr., Orange, Conn. 06477

[21] Appl. No.: 09/181,085

[22] Filed: Oct. 28, 1998

Related U.S. Application Data

[63] Continuation-in-part of application No. 09/037,726, Mar. 9, 1998, abandoned.

[51] Int. Cl.⁶ ............................ B65D 85/57; B65D 85/30
[52] U.S. Cl. ...................... 206/308.1; 206/310; 206/311; 16/222
[58] Field of Search ................................ 206/308.1, 309, 206/310, 311, 312, 313, 232; 16/222

[56] References Cited

U.S. PATENT DOCUMENTS

| | | | |
|---|---|---|---|
| 4,702,369 | 10/1987 | Philosophe | 206/308.1 |
| 4,793,480 | 12/1988 | Gelardi et al. | 206/308.1 |
| 4,987,639 | 1/1991 | Baiuley et al. | 16/222 |
| 5,244,085 | 9/1993 | Lammerant et al. | 206/310 |
| 5,259,498 | 11/1993 | Weisburn et al. | 206/308.1 |
| 5,284,243 | 2/1994 | Gelardi et al. | 206/310 |
| 5,284,248 | 2/1994 | Dunker | 206/444 |
| 5,685,425 | 11/1997 | Choi | 206/310 |
| 5,803,251 | 9/1998 | Gartz | 206/310 |
| 5,839,576 | 11/1998 | Kim | 206/308.1 |
| 5,845,771 | 12/1998 | Fu | 206/308.1 |

FOREIGN PATENT DOCUMENTS

WO 96/23304  8/1996  WIPO ............................ G11B 23/03

*Primary Examiner*—Paul T. Sewell
*Assistant Examiner*—J. Mohandesi

[57] ABSTRACT

A case and tray for holding two high-density media recording devices, commonly known as compact discs or CDs, on opposite planar surfaces of a tray molded of brittle, transparent polystyrene. The tray will fit in a conventional case, commonly called a jewel box, adapted to receive a tray for holding only one compact disc. An insert is disposed at each side of the tray and each has an outwardly extending pin disposed thereon. The pin is arranged to fit into retaining openings in sidewalls of the conventional case into which the tray will be fitted, whereby to hold it in place. A pivot point is disposed between the sidewall and the planar surface. A frangible membrane having a thickness approximating the thickness of flashing is arranged with the pivot point. The frangible membrane is arranged to hold the tray and the inserts as a single unit until the tray is fitted into the case and is arranged to break so the tray can swing, thereby allowing access to both sides thereof. The tray can be arranged to swing in either a portfolio or book style from the case depending upon which retaining opening the pin is fitted.

25 Claims, 11 Drawing Sheets

CASE AND TRAY FOR HOLDING TWO MEDIA STORAGE UNITS

RELATION TO OTHER APPLICATIONS

This application is a continuation-in-part of my application, Ser. No. 09/037,726, filed Mar. 9, 1998abandoned.

FIELD OF THE INVENTION

The present invention relates to a case and tray for holding two high-density media recording devices, commonly known as compact discs or CDs, or one CD and a 3.5 inch microrecording floppy disc. The invention particularly relates to a tray for holding the two devices in a back-to-back relationship, the tray being adapted to be fitted into a conventional case, that is, one designed to receive a tray adapted to hold only one compact disc, commonly called a jewel box. The tray of the present invention is particularly suited to be molded with brittle and/or transparent molding plastics, such as polystyrene, commonly called crystal styrene. The principal reason for molding the trays from transparent materials, such as, polystyrene, is the compact disc manufacturers want an additional viewing surface for advertising, that is, the surface which is viewable beneath the tray when the case is opened.

DESCRIPTION OF THE PRIOR ART

Molded plastic trays for holding two high-density media recording devices in a back-to-back relationship are well-known to the art. Also known to the art are trays molded of polystyrene which is a transparent but highly brittle material. The cases and trays made of polystyrene are used to store and display the discs for retail sale. Even though the case is relatively inexpensive, when compared to the cost of the compact discs it holds, it must be strong enough to hold the discs over a long period of time and withstand frequent opening, closing, dropping, and rough handling during shipping and processing on automated assembly lines.

Industry requirements and consumer preferences have dictated the dimensions of the case. Sizes greater than these predetermined dimensions, especially greater thickness, have led to a lack of acceptance because oversized cases are more expensive, take up more shelf space and are not compatible with existing packaging automation. They have not been accepted by consumers because they are more difficult to store, especially by those who own large collections of compact discs.

The recording, software, game and movie industries currently market works which are too lengthy and require more than one compact disc or have been modified to require more than one compact disc. Increasing the thickness of the case to accommodate a second disc is not always acceptable to the consumer. The industries have thus sought a case for two compact discs which has the same thickness as a case for the single compact disc and is compatible with automated packaging equipment currently in use.

Popular cases currently manufactured for holding two compact discs on a single tray include a rectangular base, a corresponding rectangular cover pivotally attached to the base and a rectangular tray for holding the compact disc also hingedly attached to the base, whereby the tray can be swung outwardly to provide the consumer with access to both sides.

A patent to Dunker, U.S. Pat. No. 5,284,248, discloses a tray and case including a base and a cover which is hingedly attached to the base. A tray is pivotally mounted in the base at the end opposite where the cover is hinged. In the embodiment shown by the patent, the tray cannot swing substantially beyond 90° because it engages an end wall of the case.

A further development in cases for holding two compact discs is disclosed by Lammerant et al., U.S. Pat. No. 5,244,085. In this patent, a base for the case was specially designed to receive pins on the tray to enable the tray to be swung outwardly in a portfolio style. In this way, the compact disc on the underside of the tray can be easily removed because the tray can be rested upon a table and is adequately supported while the compact disc is being removed. Importantly, however, a special case had to be designed to receive the tray. The design required openings in special locations to receive the pivot points of the tray. Subsequently, a case was disclosed in the patent to Choi, U.S. Pat. No. 5,685,425. In the Choi patent, also, the tray was disposed within a specially designed case. Choi's pivot point is adjacent the spine of the case, thereby enabling the tray to be moved like a page in a book. In each of the above-described patents the case had to be specially designed to receive a pivotally disposed tray.

A standard case for holding a single compact disc has a base including a bottom, two sidewalls, one on each side of the bottom, an end wall and a spine. A relatively large cover pivot opening is disposed in each of the sidewalls adjacent the spine to receive inwardly facing pins disposed on arms which extend from the cover. The pins fit into the relatively large cover pivot openings in the base and provide a pivot point for the cover to enable the user to open and close the case. A first set of retaining openings, smaller than the cover pivot openings, is formed in each of the sidewalls of a conventional base adjacent the spine to receive a set of pins on the tray to hold the tray in place within the base. Also, a second set of retaining openings is formed in each of the sidewalls of a conventional base adjacent the end wall to receive another set of pins on the tray, also to hold the tray in place within the base.

When packaging two compact discs on a single tray, the tray is pressed into the base and pins on the tray slip into openings in the base. With the trays of either Lammerant et al. or Choi, both mentioned above, special cases had to be designed to house trays which receive discs on both sides. Such specially designed cases require the compact disc packager to stock large quantities of different types of bases and covers in inventory to package their compact discs.

United States Patent to Gelardi et al., U.S. Pat. No. 5,284,243, discloses a tray for holding two compact discs which can be fitted into a conventional case. A so-called living hinge is used to allow both sides of the tray to be accessed when it is placed in a conventional case. Living hinges depend upon the use of a flexible plastic material such as polyethylene and are well known to the art for many different applications. The Gelardi et al. patent utilizes the living hinge so the tray may be pivoted over the spine of the case. Polyethylene, however, is not transparent. One cannot see clearly through the tray to the bottom of the case. Thus, while the Gelardi et al. patent provided for the disposition of a tray in a case conventionally made for storing only one compact disc, it did not provide clear, glass-like transparency. Styrene provides such transparency, but because of its inherent brittleness it is impossible to make a living hinge from polystyrene.

International Application Number WO96/23304, published Jan. 8, 1996, based on International Application PCT/FR96/00091 by Cha et al., discloses a molded styrene tray which can be used to hold two compact discs and which can be disposed in a conventional case which is adapted to hold only one compact disc. The tray of the Cha et al. application includes two molded plastic material elements connected to each other by a hinge made of a flexible sheet of Mylar. The hinge is fixedly attached to each of the elements by a technique called over-molding. While the tray described in the above-mentioned application can be disposed within conventional cases, the use of the Mylar over-molded strip slows the production rates significantly, and also introduces additional costs. Moreover, the Mylar strip over a prolonged period of time can become brittle and will crack, thus destroying the tray.

SUMMARY OF THE INVENTION

According to the present invention I have discovered a tray which can be molded of brittle, transparent plastic for holding two high-density media recording devices, such as, two compact discs, or one compact disc and one 3.5 inch microrecording floppy disc on opposite sides of a planar surface, and for providing access to both sides of the tray. The tray can be disposed within a conventional molded transparent case, commonly called a jewel box, which is adapted to hold only one compact disc.

In one embodiment (wherein the tray swings in a book style) an insert is disposed at each end of a shelf and at least one of the inserts has an outwardly extending pin disposed thereon. The pin is adapted to fit into a conventionally disposed retaining opening in a sidewall of the case so the tray is held in place. A tray pivot point is disposed between the shelf and the planar surface, and a frangible membrane cooperates with the shelf and the planar surface to hold the shelf and the planar surface as a single unit until the tray is disposed within the case. When the membrane is broken, the tray can pivot to allow access to both planar surfaces after the tray is fitted within the case. In a second embodiment (wherein the tray swings in a portfolio style) a tray similar to the one described above is used. An insert is disposed on each of the edges of the tray and an outwardly extending pin is disposed on each of the inserts. The pins are adapted to fit into the retaining openings conventionally formed in the sidewalls of the case into which the tray will be fitted, whereby to hold the tray in place in the case. Pivot points are disposed between the inserts and the tray. Frangible membranes are arranged to hold the tray and the inserts as a single unit until the tray is disposed within the case, and then will break so the tray can swing around the pivot to allow access to both planar surfaces after the tray is fitted within the case.

Preferably, the tray pivot point is formed of at least one protuberance and at least one opening, and the protuberance is adapted to fit into the opening. The frangible connection is a molded membrane associated with the protuberance and the opening. In one embodiment of the connection, the membrane is disposed between the protuberance and the opening. In another embodiment the frangible connection is a membrane between the tray and the insert, adjacent the pivot point. In yet another embodiment, the frangible connection is formed between a pusher flange extending from the tray and the insert. Also, it is preferred that the distance between the outer surfaces of the two inserts (that is, the surfaces which will abut the sidewalls of the base) be slightly greater (in the order of 0.5 to 2 mm) than the interior width of the case (that is, the distance between the insides of the sidewalls) into which the tray will be fitted so when the tray is forced into the case, the step of fitting will break the frangible membrane so the tray will be free to swing.

My invention further involves a hinge assembly for use with a tray for holding two compact discs in a back-to-back relationship, the tray being adapted to be fitted within a conventional case. The hinge assembly includes a pair of inserts and a shelf connecting the inserts together. There is at least one first pin facing outwardly from each of the inserts. The first pin is adapted to be seated within first retaining openings on sidewalls of the conventional case. Also, there is at least one protuberance facing inwardly from each of the inserts and adapted to fit within pivot openings on flanges disposed beneath the shelf. A frangible membrane connects the inserts and the tray, whereby the tray and shelf are temporarily held together as a single unit prior to fitting of the tray within the case. The frangible membrane is then broken to allow the protuberances to be seated within the pivot openings and form a pivot point and provide for swinging of the tray around the pivot point to allow access to both sides of the tray.

When using the principles of the present invention, significant savings can be realized, not only in labor and reducing the necessity of warehousing of more than one style of case, but also in the necessity of utilizing multiple sets of high capital cost automation in the assembly and packaging of compact discs.

DESCRIPTION OF THE PREFERRED EMBODIMENTS

Figure 1:
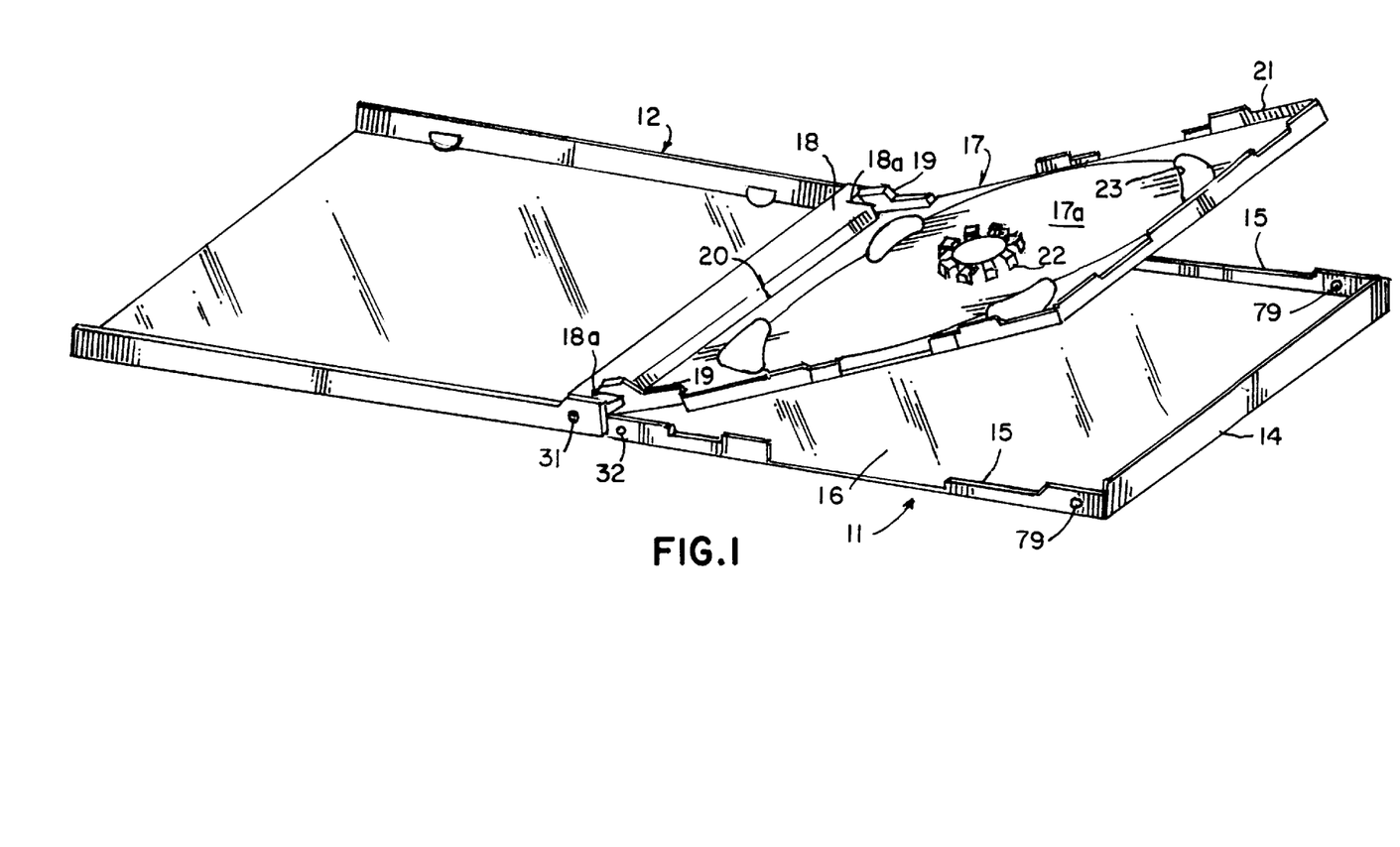
FIG. 1 is a perspective view of one embodiment of a conventional case for holding compact discs with the tray of the present invention. In this embodiment, the tray swings in a book style.

Referring to FIG. 1, the compact disc case of the present invention includes a base 11 and a cover 12. Base 11 has retaining openings 32, 79 in the sidewalls to receive a tray designed to hold only one compact disc. The cover 12 is hingedly connected to the base 11 at pivot points formed by pins 31 (one shown) fitting into a pivot opening (not shown) which allows the case to be opened and closed. The base 11 has an end wall 14 and sidewalls 15 disposed around a bottom 16. A tray 17 formed of a disc-receiving planar surface 17a on each side of the tray 17 fits into the base 11. A hub 22 is centrally disposed in the planar surfaces 17a to receive and hold CDs on both sides of the tray 17, or a CD on one side and a 3.5 inch microdisc on the other. The hub 22 can be of conventional design for holding two CDs, such as disclosed in the Dunker patent mentioned above, or as disclosed in my copending patent, U.S. Pat. No. 5,803,251. In the embodiment of FIG. 1, a shelf 18 is hingedly connected to the tray 17 with protuberances (not shown) which are connected to flanges 19, the flanges 19 being integrally molded to the edges of tray 17. In this embodiment, a ledge 20 is shown depending from shelf 18. Flanges 19 are free to move in an 180° arc within cutouts 18a formed in shelf 18 and ledge 20. The tray 17 has a peripheral size which enables it to be fitted within the base 11. A rim 21 can extend (or partially extend) around the sides the edge of the tray 17 to provide rigidity. An array of openings 23 is formed in the planar surfaces 17a to enable the user to remove CDs easily when they are mounted on the tray.

Figure 2:
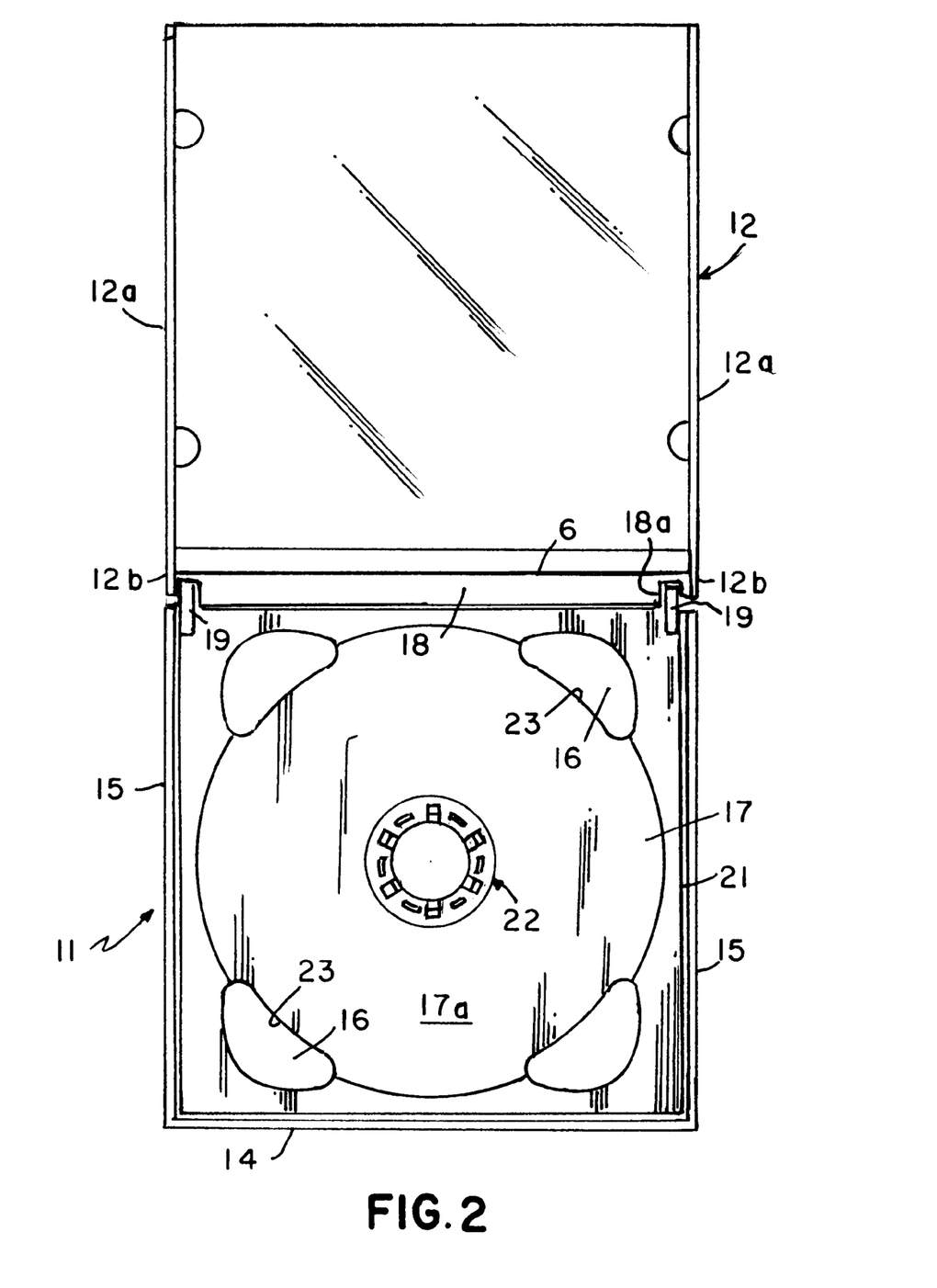
FIG. 2 is a plan view of the inside of the above-shown embodiment of a case and tray of the present invention.

Referring now to FIG. 2, a conventional jewel box includes the base 11 with a flat rectangular bottom 16 (shown through openings 23), two lateral sidewalls 15, an end wall 14 and a spine 6 (that is, the side opposite end wall 14). Retaining openings (not shown) are formed in the sidewalls 15 adjacent spine 6 of the base 11 (that is, the side opposite the end wall 14). Cover 12 is attached to base 11 by means of inwardly facing pins (not shown) which are disposed upon longitudinal extensions 12b of sidewalls 12a. Tray 17 is fitted within the base 11. Shelf 18 extends between sidewalls 15 and holds tray 17 in place within the base 11. Shelf 18 is connected to tray 17 by means of pivot points located in flanges 19 (attached to tray 17) and inserts (not shown, but frangibly attached to shelf 18).

Figure 3:
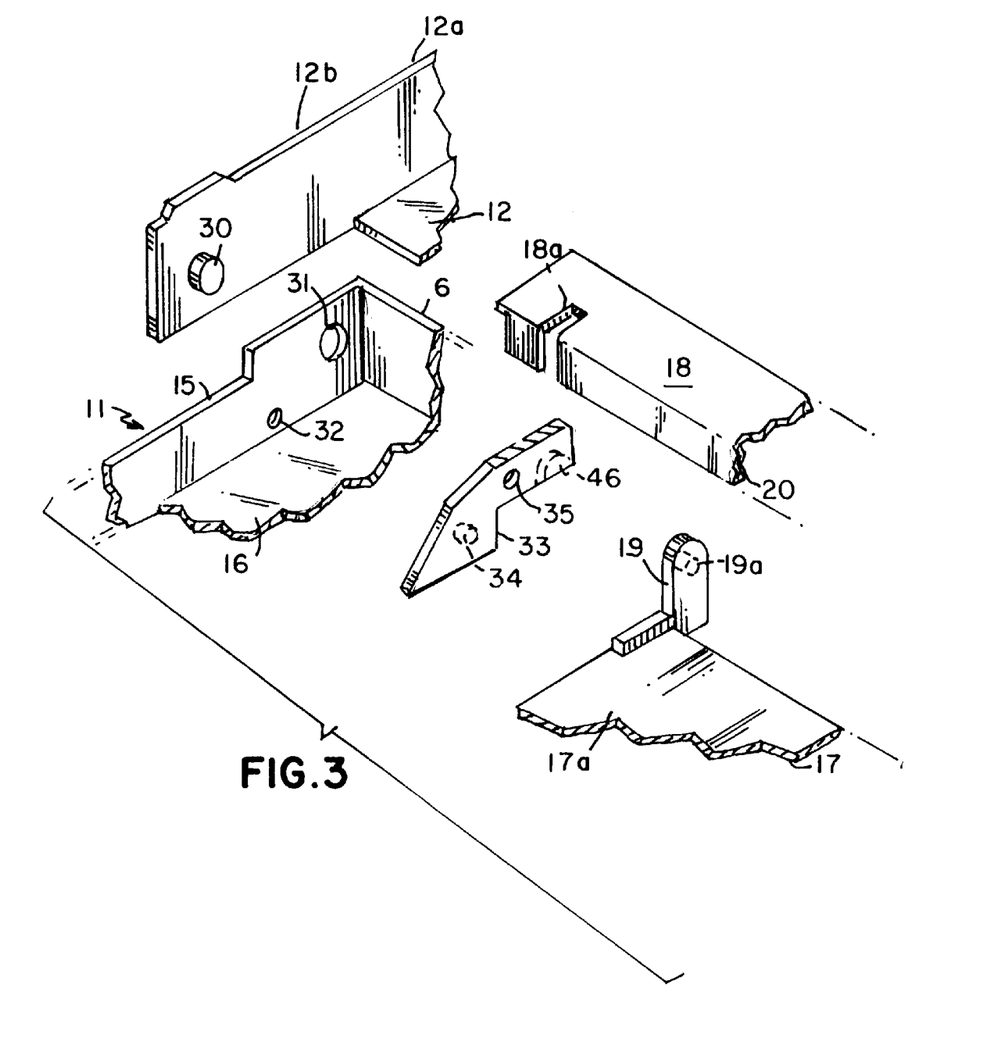
FIG. 3 is an exploded view in perspective of one corner of one embodiment of the hinge assembly.

Referring to FIG. 3, an exploded view of a corner of the case of one embodiment of the present invention is shown. Sidewalls 12a of cover 12 have extensions 12b disposed thereon, as is conventional. The extensions 12b carry a cover pivot pin 30 which fits into cover pivot opening 31 in sidewall 15 of the base of the case. Cover 12 swings around cover pivot pin 30, as is conventional. A smaller retaining opening 32 is spaced about 1.8 to 2.1 mm from its centerline to the bottom 16 of the base and about 5 mm from the centerline of the cover pivot opening 31 (adjacent the spine 6). Each of the elements of the case herein described as conventional and their locations in the case are to be found in cases designed to receive a tray which holds only one compact disc, commonly called a jewel box. Such cases have a base and a cover, with a bottom, two sidewalls, a spine and an end wall. The sidewalls have a set of cover pivot openings, a first set of retaining openings adjacent the spine. The centerline of the first set of retaining openings is spaced about 11 mm from the centerline of the cover pivot openings and a second set of retaining openings is spaced about 127 mm from the pivot openings 31.

According to this embodiment of the present invention, shelf 18 receives a pair of inserts 33 (one of which is shown) depending therefrom and integrally molded therewith. The bottom of insert 33 rests (or nearly rests, that is, about 0.15 mm above) upon the bottom 16 of the base of the case and is nested in the corner. A pin 34 (shown in dotted lines) faces outwardly from the insert 33 and fits into the conventional retaining opening 32 in the sidewall 15. Pin 34 has a diameter between about 1.75 and slightly less than 2.0 mm, and extends outwardly about 0.5 to 1.0 mm from the insert 33 to enable it to firmly fit in retaining opening 32. Preferably, for additional support, a second pin 46 (shown in dotted lines as a half-pin) also faces outwardly from the insert 33 and is seated in pivot opening 31 (along with cover pivot pin 30). Pin 46 has a relatively shallow depth so as not to interfere with the disposition or rotation of cover pivot pin 30 within cover pivot opening 31. The shelf 18 and each of the inserts 33 are firmly fitted within the base 11 and secured thereto by means of the pins in the retaining openings. The perimeter of shelf 18 rests upon the top of spine 6 and sidewalls 15 to provide additional support.

An opening 35 is formed in insert 33. Protuberance 19a (shown in dotted lines) is arranged to fit within the corresponding opening 35 in flange 19 which is disposed on the edge of planar surface 17a. Although not shown in this Figure, protuberance 19a is connected to the opening 35 in the insert 33 by a thin frangible membrane which enables the tray 17 to be rigidly, but temporarily, held with the insert 33 and the shelf 18. In this embodiment, a ledge 20 is integrally connected to the shelf 18, although in other embodiments the shelf and the ledge can be separate from each other. Flange 19 can move within slot 18a formed in shelf 18 when the frangible membrane is broken.

Figure 4:
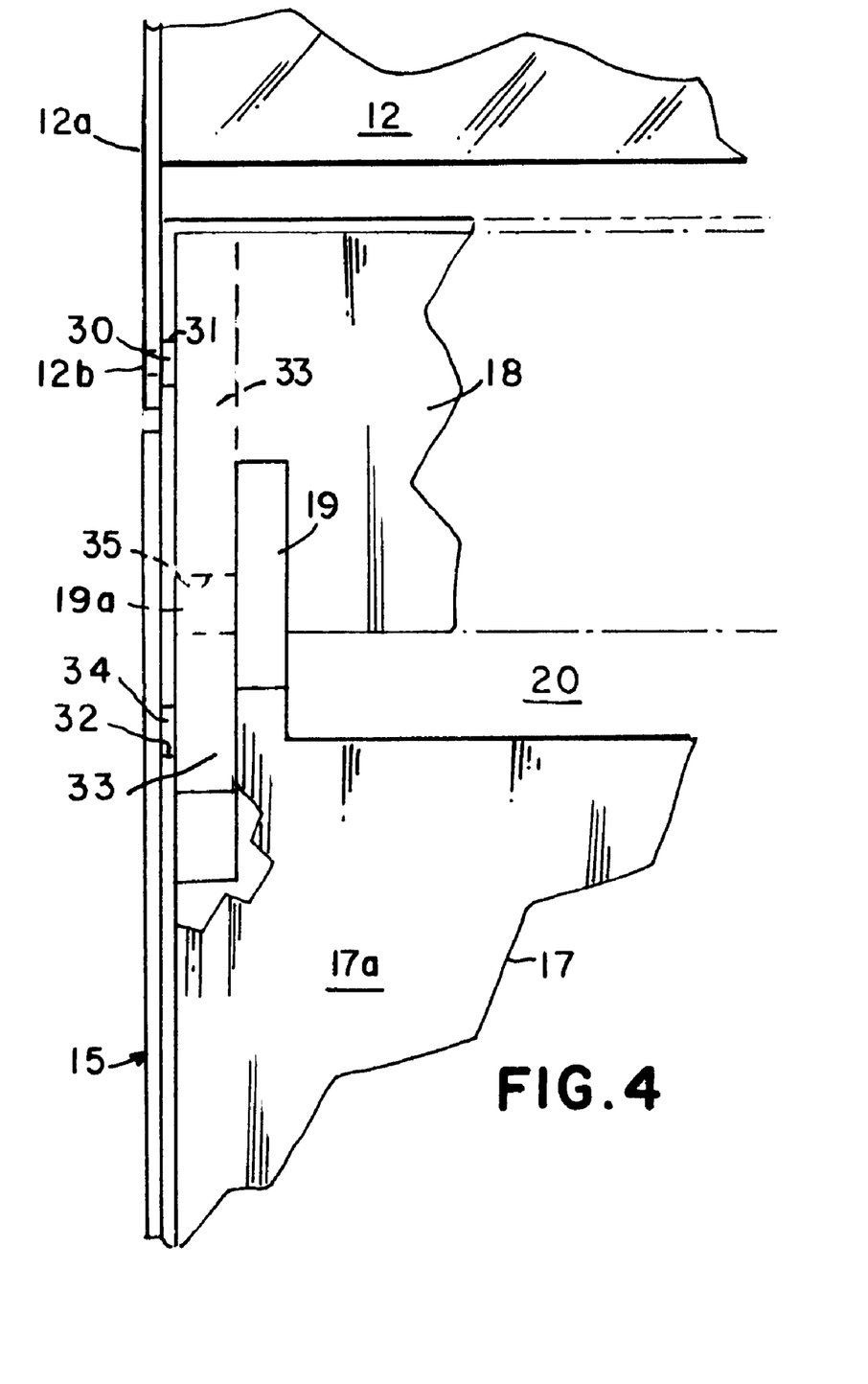
FIG. 4 is an enlarged view of one corner of the tray, partially broken away, fitted within a conventional case.

Referring to FIG. 4, a corner of the assembled case of FIG. 3 is shown. Cover 12 is hingedly attached to the base by means of extension 12b. Cover pivot pin 30 on extension 12b is seated in cover pivot opening 31. Insert 33 is integrally molded with shelf 18. Pin 34 extends from the side of insert 33 and fits into conventionally disposed retaining opening 32 in the sidewall 15. Flange 19 is molded as an integral part of planar surface 17a. Protuberance 19a extends from flange 19 and fits in and is detachably connected (by the frangible membrane) to opening 35 in insert 33 which enables tray 17 to be rotated (after breaking the frangible membrane) to provide access to both sides of tray 17. To keep the shelf 18 and inserts 33 temporarily rigid relative to the tray 17, the membrane (shown in FIGS. 5a, 5b and 5c) is used to connect the inserts to the tray.

Figure 5A:
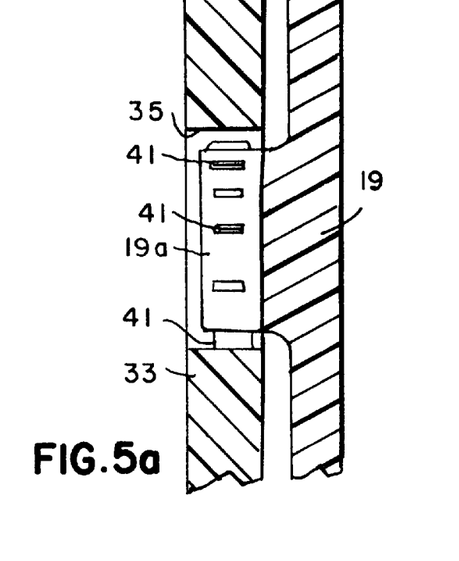
FIGS. 5a and 5b are enlarged partial cross-sectional views of the pivot point. They illustrate one embodiment of a frangible membrane connecting elements of the tray together prior to breaking.
Figure 5B:
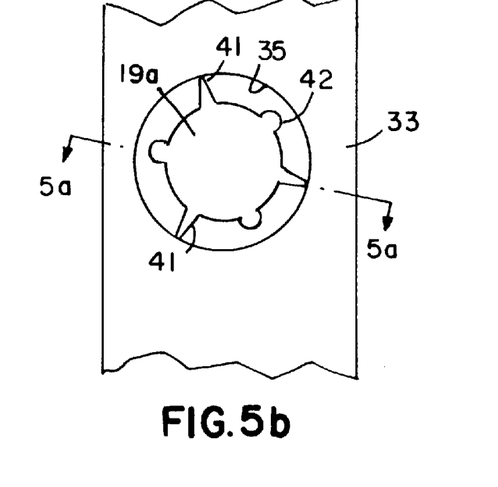
Figure 5C:
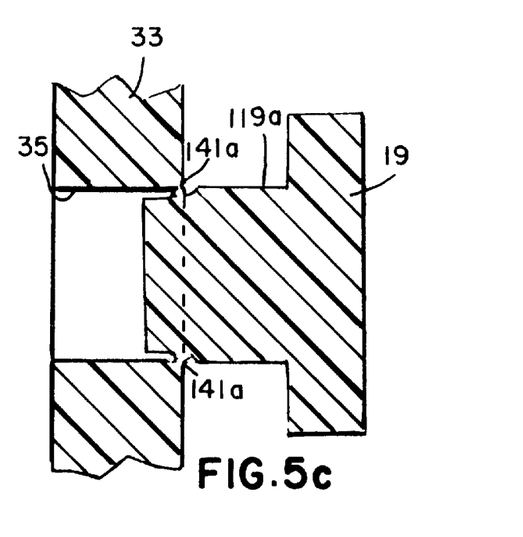
FIG. 5c illustrates another embodiment of the frangible membrane useful at the pivot point.

Referring now to FIGS. 5a, 5b and 5c, flange 19 carries protuberance 19a which is seated in the opening 35 in insert 33. An example of an embodiment of the frangible membrane being disposed at the pivot point is shown in FIGS. 5a and 5b. An array of frangible membranes 41 connects protuberance 19a to the opening 35. Generally, these frangible membranes have a thickness (at least in one location thereon) corresponding to the thickness of flashing, generally between about 0.05 and 0.7 mm. They can be easily broken by either the force required to lift the tray from the base, or by compressive horizontal forces generated when the tray is inserted into the base during packaging and/or assembly operations. Nubs 42 are disposed around the protuberance 19a to prevent inordinate wobble after the frangible membranes 41 are broken. In FIG. 5c another embodiment is shown. Membrane 141a is shown disposed between the periphery of opening 35 in insert 33 and the periphery of pin 119a. In this embodiment the frangible member 141a is at the pivot point. Although the membrane 141a is shown to be at the periphery of opening 35, it may also be displaced inwardly of opening 35 so a portion of pin 119a is already within opening 35. While the frangible member is preferably disposed at the pivot point, other locations adjacent the pivot point may also be used which connect the insert 33 to tray 17 as shown in FIGS. 5c and 8c.

In the FIG. 5c embodiment, membrane 141a connects insert 33. This embodiment is especially responsive to breakage by either horizontal compressive forces or vertical forces occurring when the tray is swung open from in the bottom of the case. As mentioned previously, the distance between the outer surfaces of the inserts 33 is preferably slightly greater than the space between sidewalls of the case into which the tray will be fitted so when the tray is forced into the case, the step of fitting will break the frangible membrane 41 (or 141a) so the tray will be free to pivot.

Figure 6A:
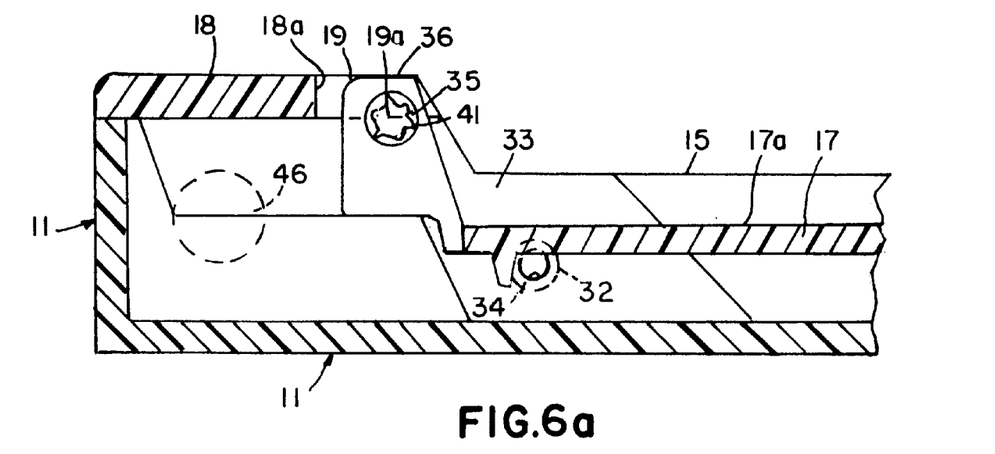
FIGS. 6a and 6b are cross-sectional views of one embodiment of the hinge assembly of the present invention.
Figure 6B:
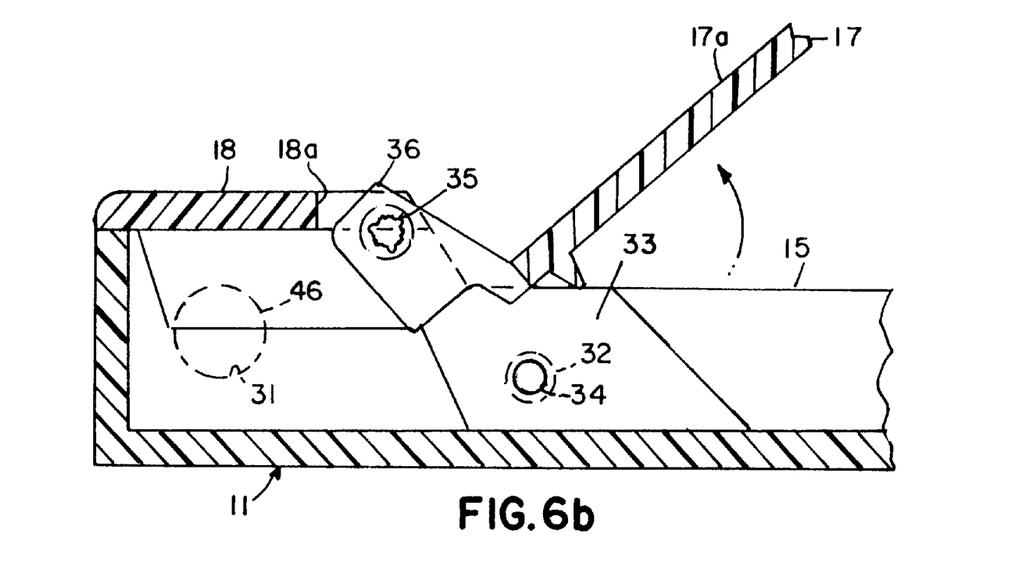

Referring now to FIGS. 6a and 6b, the insert 33 is shown disposed within the base 11. Retaining pin 34 extends outwardly from insert 33 and fits into retaining opening 32 (shown in dotted lines) in the sidewall (not shown). Planar surface 17a carries flange 19 which is disposed within slot 18a in shelf 18. Insert 33 has the pivot opening 35 into which protuberance 19a is disposed. Protuberance 19a is connected to opening 35 by means of membranes 41. The compressive forces generated when the assembly is forced into the base can break the membrane 41, or when tray 17 is lifted the membranes 41 will crack, both situations allowing for a full 180° around protuberance 19a.

Figure 7A:
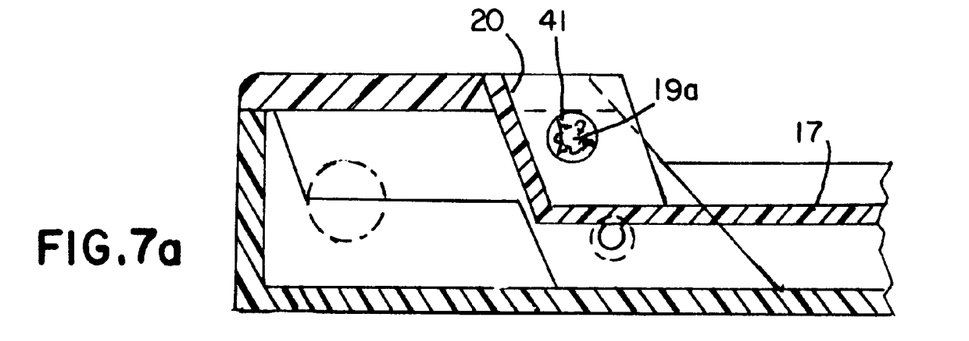
FIGS. 7a and 7b are cross-sectional views of another embodiment of the hinge assembly of the present invention.
Figure 7B:
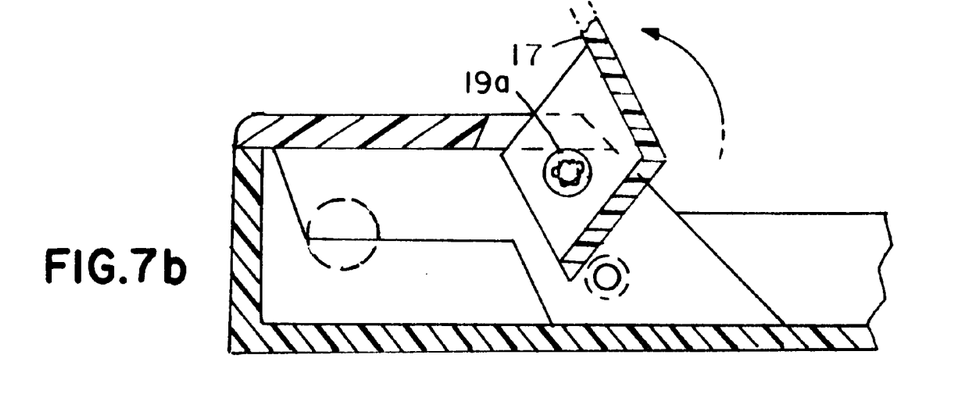
Figure 7C:
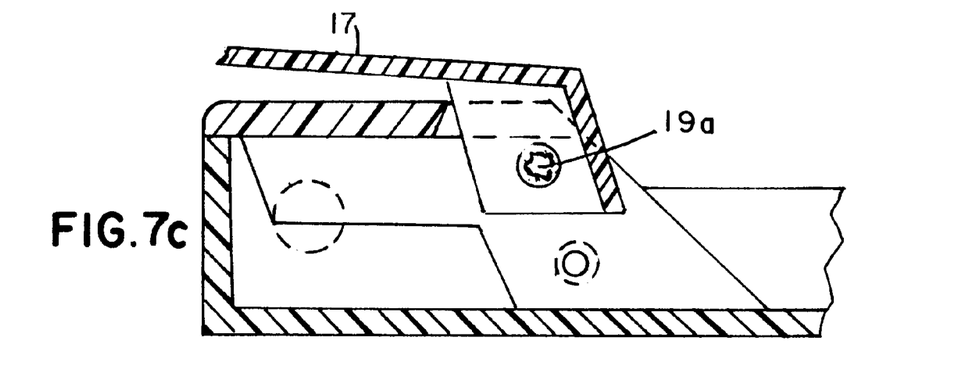

FIGS. 7a, 7b and 7c differ from the embodiment shown in FIGS. 6a and 6b in that tray 17 and ledge 20 are integrally connected together, and when tray 17 is rotated, ledge 20 will rotate with it. As specifically shown in FIG. 7c, tray 17 can be rotated a full 180° around protuberance 19a after membranes 41 are broken.

Figure 8A:
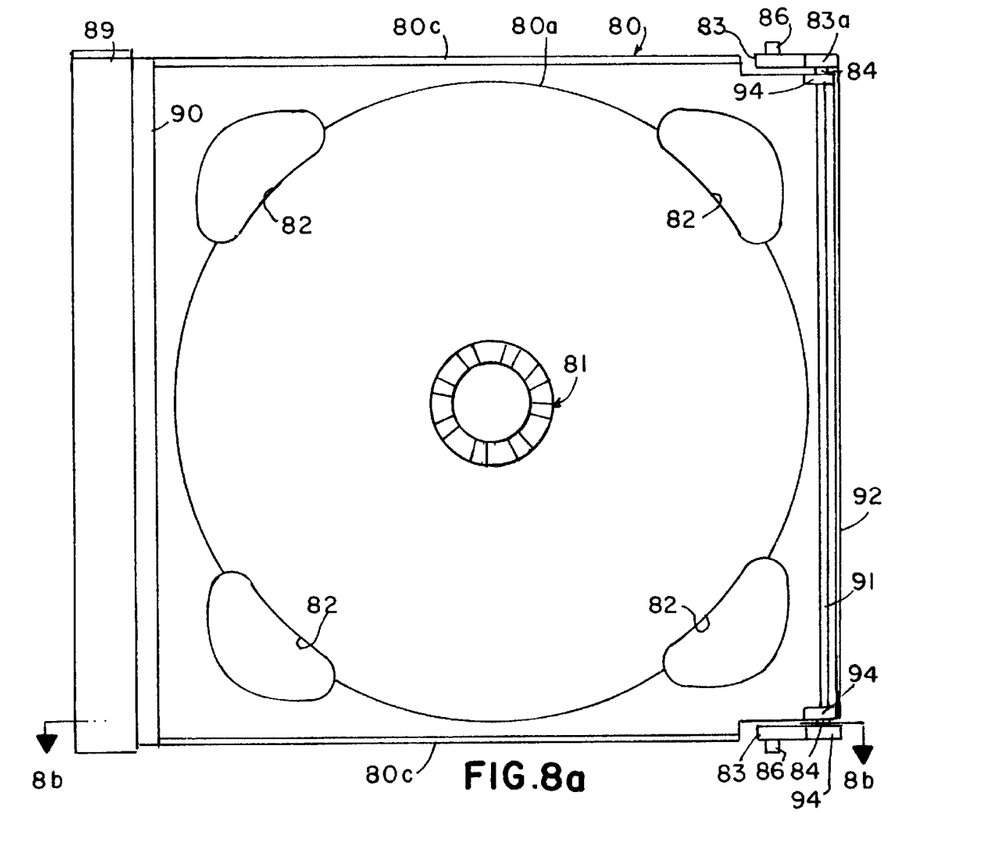
FIG. 8a is a top plan view of another embodiment of the tray of the present invention.
Figure 8B:
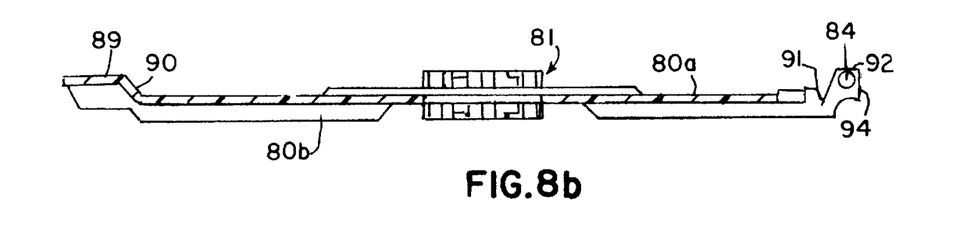
FIG. 8b is a cross-sectional view of the side of the tray taken along line 8b—8b of FIG. 8a. In this embodiment, the tray swings in a portfolio style.
Figure 8C:
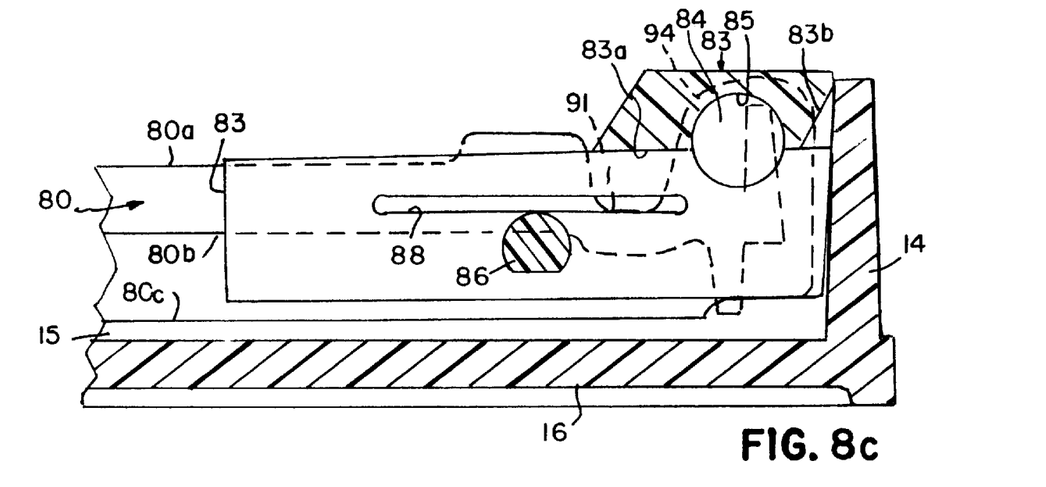
FIGS. 8c and 8d are enlarged views of the portfolio style hinge fitted within the bottom of a conventional case.

Referring to FIGS. 8a and 8b, a tray 80 is shown having two disc-receiving surfaces 80a and 80b (one on each side). A hub 81 is centrally disposed in the disc-receiving surfaces 80a and 80b, and serves to hold discs (or one disc and a 3.5 inch microrecording device) on each disc-receiving surface. Openings 82 are disposed in the tray 80 to allow for the removal of discs stored thereon. A shelf 89 is disposed at the end of tray 80 and is elevated from the planar surface 80a by ledge 90. Shelf 89 will rest upon the spine of the base, as is conventional. A longitudinally extending rim 92 provides support for the tray 80 against torsional rotation. If desired, a rim 80c can be added to the edges of the tray 80 to provide additional rigidity. The embodiment of FIGS. 8a to 8d differs from the embodiment shown in FIG. 2 in that the tray 80 opens in a portfolio style from the end wall base of the case.

In this embodiment, two inserts 83 are disposed on opposite sides of tray 80 and are attached within flanges 94 to two pins 84 by frangible membranes, such as described in FIGS. 5a to 5c. Inserts 83 have retaining pins 86 which fit into retaining openings 79 (shown in FIG. 1) in the sidewalls 15 of conventional cases designed to receive only one compact disc. Such cases have retaining openings in the sidewalls 15 adjacent the end wall 14 spaced about 127 mm from the centerline of the retaining opening 79 to the centerline of the pivot opening 31 and about 1.8 to 2.1 mm from the bottom 16. The distance between the outer surfaces of the inserts 83 is slightly greater (in the order of 0.5 to 2 mm) than the space between the inside of the sidewalls 15 of the bottom of the conventional case into which the tray will be fitted, whereby when the tray 80 and the inserts 83 are forced into the bottom of the case, the step of fitting will break the frangible membrane so the tray 80 is free to swing. Full 180° rotation of tray 80 is obtained by providing recess 91 in the tray 80 so it can fit over the end wall 14 of the case.

Figure 8D:
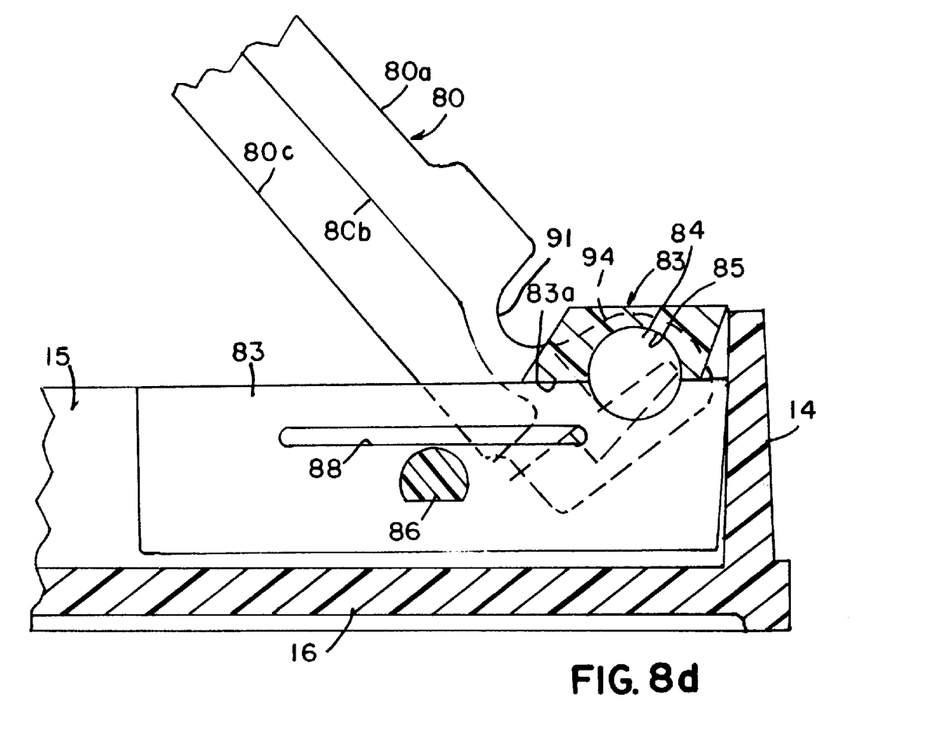

In FIGS. 8c and 8d, the tray 80 is shown with the inserts 83 nested in the base of the case adjacent bottom 16 and engaging end wall 14. A shoulder 83a extending outwardly from insert 83 rests upon the top of sidewall 15. Shoulder 83a prevents movement of the insert all the way to the bottom 16 of the case, while a slanted edge 83b enables the insert 83 to be fitted snugly within the corner of the base and prevents disengagement when the tray is opened to 180° or more. The bottom of the insert is raised slightly from the bottom 16 to provide space for the disposition of advertising literature. A rim 80c is disposed on the periphery of tray 80 to provide rigidity. Tray 80 carries a pivot pin 84 which, when assembled in the base of the case, will fit into a pivot opening 85 disposed at the pivot point of the tray within a flange 94. An opening 88 is formed within the insert 83 directly above the retaining pin 86 which allows the pin 86 to bend inwardly slightly upon insertion of the insert 83 and the tray 80 into the base of the case. Essentially, slot or opening 88 acts as a spring and allows both inward and torsional motion of retaining pin 86 when the assembly is being fitted into the base of the case. Alternatively to the horizontal disposition of the opening 80 (as shown), the opening may also be one or two vertical slots. The slots are disposed closely adjacent to pin 84. As shown in FIG. 8d, a membrane illustrated in FIGS. 5a to 5c has been broken and the tray 80 is free to swing a full 180°.

Figure 9A:
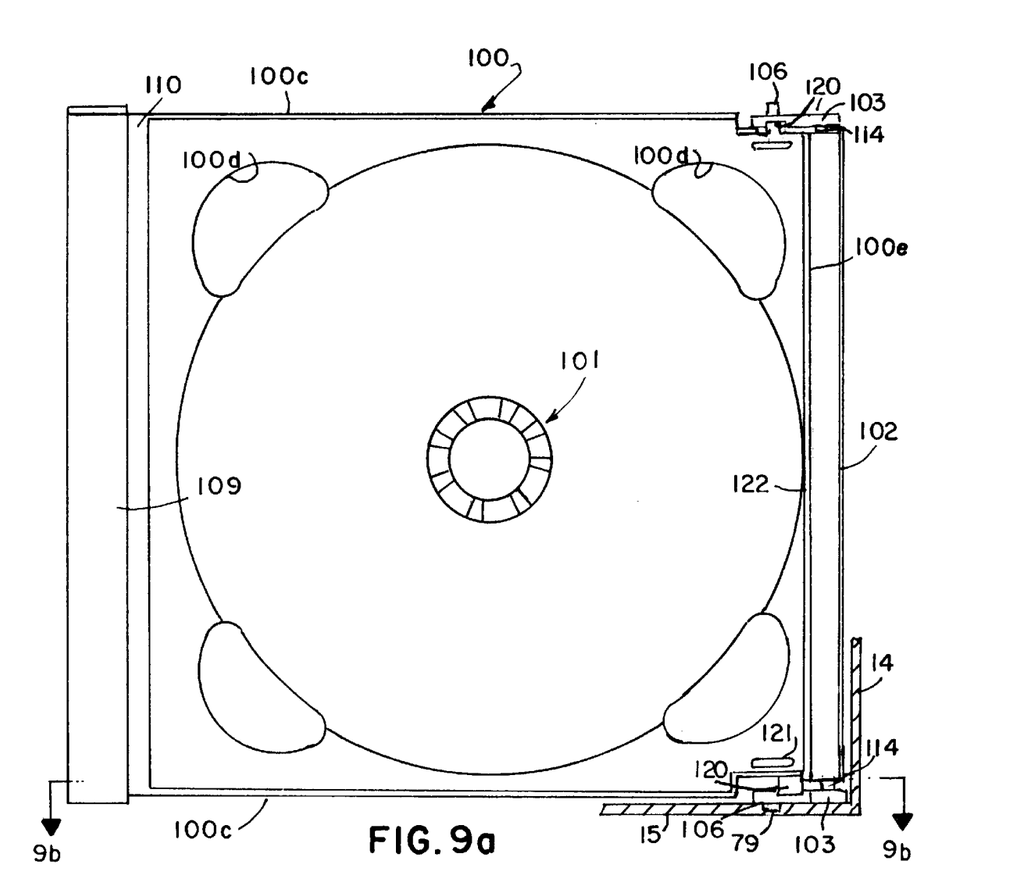
FIG. 9a is a top plan view of another embodiment of the tray of the present invention. The embodiment is similar to the embodiment shown in FIG. 8, except the insert and the tray are connected by membranes extending between the tray and the insert, rather than between the elements of the pivot point.
Figure 9B:
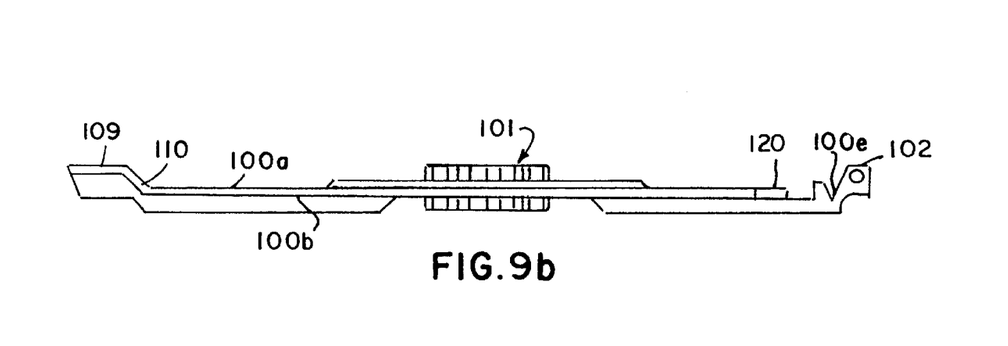
FIG. 9b is a side elevational view of the tray without the insert.

Referring to FIGS. 9a and 9b, a tray 100 is shown having two disc-receiving surfaces 100a and 100b (one on each side). A hub 101 is centrally disposed in the dis-crceiving surfaces 100a and 100b, and serves to hold discs on each disc-receiving surface. Openings 100d are disposed in the tray 100 to allow for the removal of discs stored thereon. A shelf 109 is disposed at the end of tray 100 and is elevated from the planar surface 100a by ledge 110. Shelf 109 will rest upon the spine of the base of the case, as is conventional. A longitudinally extending rim 102 provides support for the tray 100 against torsional rotation. If desired, rims 100c can be added to the edges of the tray 100 to provide additional rigidity. Rims 100c can extend along the entire length of the tray 100, or partially, as desired.

In this embodiment, an insert 103 is disposed on each side of tray 100. Pins 114 extend from the inserts 103 and are partially disposed within openings in rim 102 or the pins can extend from the rim 102 and be partially disposed within openings within the inserts 103. Inserts 103 have retaining pins 106 which fit into retaining openings 79 (shown in FIG. 1) in the sidewalls 15 of conventional cases designed to receive only one compact disc.

As discussed previously, such cases have retaining openings in the sidewalls 15 adjacent the end wall 14 spaced about 127 mm from the centerline of the retaining opening 79 to the centerline of the pivot opening 31 (see FIG. 1) and about 1.8 to 2.1 mm from the bottom 16 of the case. The distance between the outer surfaces of the inserts 103 is slightly greater (in the order of 0.5 to 2 mm) than the space between the inside of the sidewalls 15 of the bottom of the conventional case into which the tray will be fitted, whereby when the tray 100 and the inserts 103 are forced into the bottom of the case, the step of fitting will break the frangible membrane so the tray 100 is free to swing. Full 180° rotation of tray 100 is obtained by providing recess 100e in the tray 100 so it can fit over the end wall 14 of the case.

In the embodiment of FIGS. 9a and 9b, the two inserts 103 are attached to tray 100 by means of pusher flanges 120 which extend from disc-receiving surface 100a, as will be explained hereinafter. A protuberance 114 extends from rim 102 and fits into an opening in insert 103 and is free to rotate therein, thereby allowing the tray to swing freely in the jewel box. Slots 121 are formed behind pusher flange 120 to enable the pins 106 to shift inwardly slightly as the tray is being inserted into the jewel box before they enter the openings which will retain them there. Slots 121 serve as springs because when pins 106 are fitted in the opening in the jewel box they allow the pins 106 to move inwardly and then force the pins 106 into retaining openings 79 and keep them in place. While depicted as being disposed only immediately behind the pusher flange 120, it is to be understood that slot 121 may extend through the rim 102, thereby allowing flexure of the pins 114. A laterally extending slot 122 is formed in the tray 100 at right angles to slot 121. Slot 122 allows the rib 102 to bend inwardly and bow somewhat.

Figure 9C:
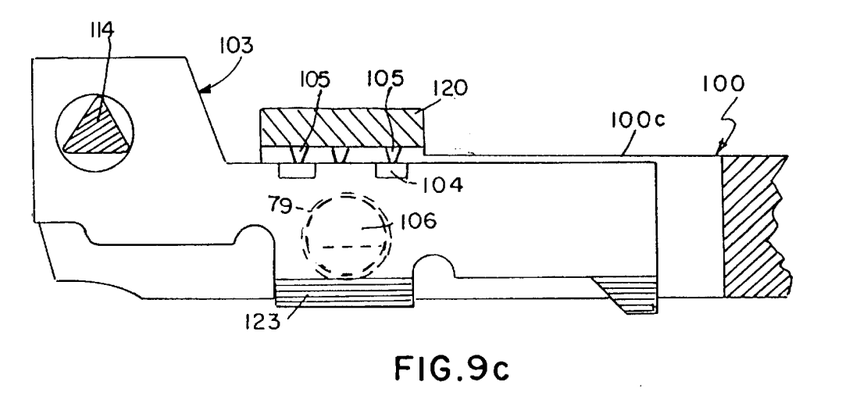
FIG. 9c is a cross-sectional view taken along the line 9c—9c of FIG. 9d of the insert and the tray before disposition in a jewel box.
Figure 9D:
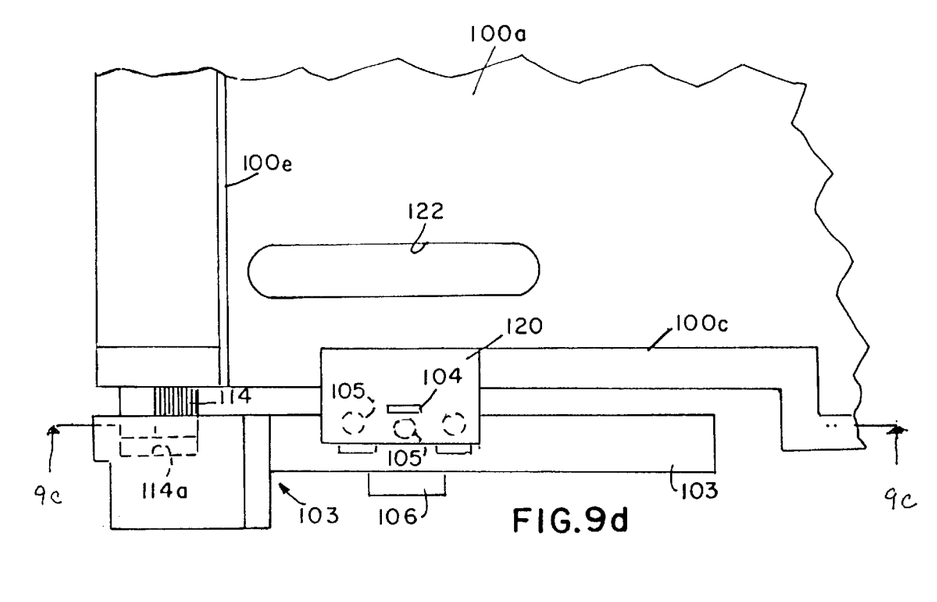
FIG. 9d is a partial plan view of the tray and the insert.

Turning to FIGS. 9c and 9d, tray 100 is attached to insert 103 by means of several frangible membranes 105 which are disposed between pusher flange 120 and insert 103. Membranes 105 each have a thickness (at least in one location) corresponding to the thickness of flashing, generally between about 0.05 and 0.7 mm. They can be easily broken by both the force exerted upon pusher flange 120 while the tray and insert are being inserted into a jewel box and by compressive horizontal forces generated as the tray in fitted into the base of the jewel box during packaging and/or assembly operations (since the distance between opposite sides of inserts 103 is slightly greater than the width of the interior of the jewel box in which it is to be inserted). To provide a repository for any broken pieces of membranes 105, complimentary cavities 104 are formed in tray 100. These cavities will receive broken portions of the membranes 105, thereby enabling insert 103 to be squeezed and be seated in the jewel box. A chamfered edge 123 on insert 103 enables the insert to easily slide into the jewel box and simultaneously provide for breaking membranes 105 as the insert moves inwardly during the assembly operation. After the pins 106 have been seated in the openings in the sidewalls of the jewel box and the membranes 105 have been broken, tray 100 will be free to swing around protuberance 114 that is seated in opening 114a. Preferably, protuberance 114 is slightly tapered and has a triangular cross section, thereby enabling it to be easily seated within the opening 114a, although other cross-sectional shapes can also be used.

It is apparent that modifications and changes can be made with the spirit and scope of the present invention, but it is my intention, however, only to be limited by the scope of the appended claims.

As my invention I claim:

1. Apparatus for storing two high-density media recording devices in a case, said apparatus comprising:
    a tray having two longitudinally extending edges, two planar surfaces and a centrally located means for receiving and retaining said high-density media devices; and
    an insert disposed at each of said longitudinally extending edges and an outwardly extending pin disposed on each of said inserts, said pins being adapted to fit into retaining openings in sidewalls of the case into which said tray will be fitted whereby to hold said tray in place in said case; and
    pivot means disposed between said inserts and said tray, said pivot means including protuberances and corresponding pivot openings, said protuberances being adapted to fit into said pivot openings; and
    frangible means arranged with said tray and said pivot means, said frangible means being adapted to hold said tray and said inserts as a single unit until said tray is disposed within said case and then break so said tray can pivot around said pivot means thereby allowing access to both sides of said tray when said tray is fitted within the case.

2. The apparatus according to claim 1 wherein the tray is molded of brittle, transparent plastic.

3. The apparatus according to claim 1 wherein the distance between the outer surfaces of said inserts is slightly greater than the space between said sidewalls of the case into which said tray will be fitted whereby when said tray is forced into said case, fitting will break said frangible means so said tray is free to pivot.

4. The apparatus according to claim 1 further including a shelf adapted to be disposed in said case and wherein said inserts depend from said shelf.

5. The apparatus according to claim 1 further including a pusher flange extending from said tray over said insert, said frangible means being disposed between said pusher flange and said insert.

6. The apparatus according to claim 5 further including cavities adjacent said frangible means on said pusher flange and/or said insert to receive fragments of said frangible means, after breaking.

7. In a case for holding two high-density media recording devices, said case having a base and a cover, said base having a bottom, two sidewalls, a spine and an end wall, said sidewalls having a set of cover pivot openings, a first set of retaining openings adjacent the spine, the centerline of said first set of retaining openings being spaced about 11 mm from the centerline of said cover pivot openings and a second set of retaining openings spaced about 127.2 mm from said pivot openings, each of said sets of retaining openings being spaced about 1.8 to 2.1 mm from said bottom, the improvement which comprises:
    a tray for receiving two high-density media recording devices, said tray having longitudinally extending edges and a central means to receive and retain said devices; and
    an insert disposed adjacent each of said edges, said inserts having outwardly extending pins disposed thereon, said pins being adapted to fit into one of the sets of retaining openings in said sidewalls whereby to hold said insert and said tray in place; and
    pivot means disposed between said inserts and said tray, said pivot means including protuberances and corresponding pivot openings, said protuberances being adapted to fit into said pivot openings; and
    frangible means associated with said pivot means and said tray, said frangible means being adapted to hold said inserts and said tray as a single unit until said tray is disposed within said case and then being arranged to break as said tray is being inserted into said case so said tray can swing thereby allowing access to both sides of said tray when said tray is fitted into said case.

8. The case according to claim 7 wherein the tray is molded of brittle, transparent plastic.

9. The case according to claim 7 wherein the distance between the outer surfaces of said inserts is slightly greater than the width of the space between said sidewalls of said case into which said tray will be fitted whereby when said tray is forced into said case, fitting will break said frangible means so said tray is free to swing.

10. The case according to claim 7 further including a shelf adapted to be disposed in said case and wherein said inserts depend from said shelf.

11. The case according to claim 7 further including a pusher flange extending from said tray over said insert, said frangible means being disposed between said pusher flange and said insert.

12. The apparatus according to claim 11 further including cavities adjacent said frangible means on said pusher flange and/or said insert to receive fragments of said frangible means, after breaking.

13. The case according to claim 7 further including spring means disposed adjacent said outwardly extending pins, said spring means including at least one slot, said slot being arranged to allow said pin to shift relative to said insert thereby allowing said pin to shift as said tray is being fitted into said case.

14. A tray for holding two high-density media recording devices, the improvement which comprises:

a shelf adapted to be disposed within a case and an insert disposed at each end of said shelf, at least one of said inserts having an outwardly extending pin disposed thereon, said pin being adapted to fit into a retaining opening in a sidewall of a case into which said tray will be fitted whereby to hold said tray in place; and pivot means disposed between said shelf and said planar surface, said pivot means including protuberances and corresponding pivot openings, said protuberances being adapted to fit into said pivot openings; and frangible means arranged with said pivot means, said frangible means being adapted to hold said shelf and said tray as a single unit until said tray is disposed within said case and then being arranged to break upon insertion of said tray into a case so said tray can pivot thereby allowing access to both sides of said tray when said tray is fitted into said case.

15. The tray according to claim 14 wherein the pivot means is at least one protuberance and at least one opening, said protuberance being adapted to fit into said opening and said frangible means is a membrane joining said protuberance and said opening.

16. The tray according to claim 14 wherein the tray is molded of brittle, transparent plastic.

17. The tray according to claim 14 wherein the distance between the outer surfaces of said inserts is slightly greater than the width of the space between sidewalls of the case into which said tray will be fitted whereby when said tray is placed into said case, fitting will break said frangible means so said tray is free to swing.

18. The tray according to claim 14 further including a pusher flange extending from said tray over said insert, said frangible means being disposed between said pusher flange and said insert.

19. The apparatus according to claim 18 further including cavities adjacent said frangible means on said pusher flange and/or said insert to receive fragments of said frangible means, after breaking.

20. The tray according to claim 18 further including a shelf adapted to be disposed in said case and wherein said inserts depend from said shelf.

21. The tray according to claim 18 wherein there are two pivot means disposed on opposite sides of said tray, said tray being suspended between said pivot means and being unitarily joined to said shelf by said frangible means before said frangible means is broken.

22. A hinge assembly for use with a tray for holding two compact discs in a back-to-back relationship, said tray being adapted to be fitted within a case, said hinge assembly comprising:

a pair of inserts; and a first pin facing outwardly from each of said inserts, said first pin being adapted to be seated within retaining openings on sidewalls of said case; and a protuberance facing inwardly from each of said inserts and adapted to fit within openings in flanges disposed on said tray; and a frangible membrane arranged to hold said tray and said inserts temporarily together as a single unit prior to fitting of said tray within said case and then be broken as the tray is being fitted into said case to allow said protuberances to be seated within said openings in the flanges and form pivot points and provide for pivoting of said tray around said pivot points to allow access to both sides of said tray.

23. The hinge assembly according to claim 22 further including a pusher flange extending from said tray over said insert, said frangible means being disposed between said pusher flange and said insert.

24. The hinge assembly according to claim 22 further including a shelf adapted to be disposed in said case and wherein said inserts depend from said shelf.

25. The hinge assembly according to claim 22 wherein the tray is molded of brittle, transparent plastic.

* * * * *